United States Patent Office 2,824,167
Patented Feb. 18, 1958

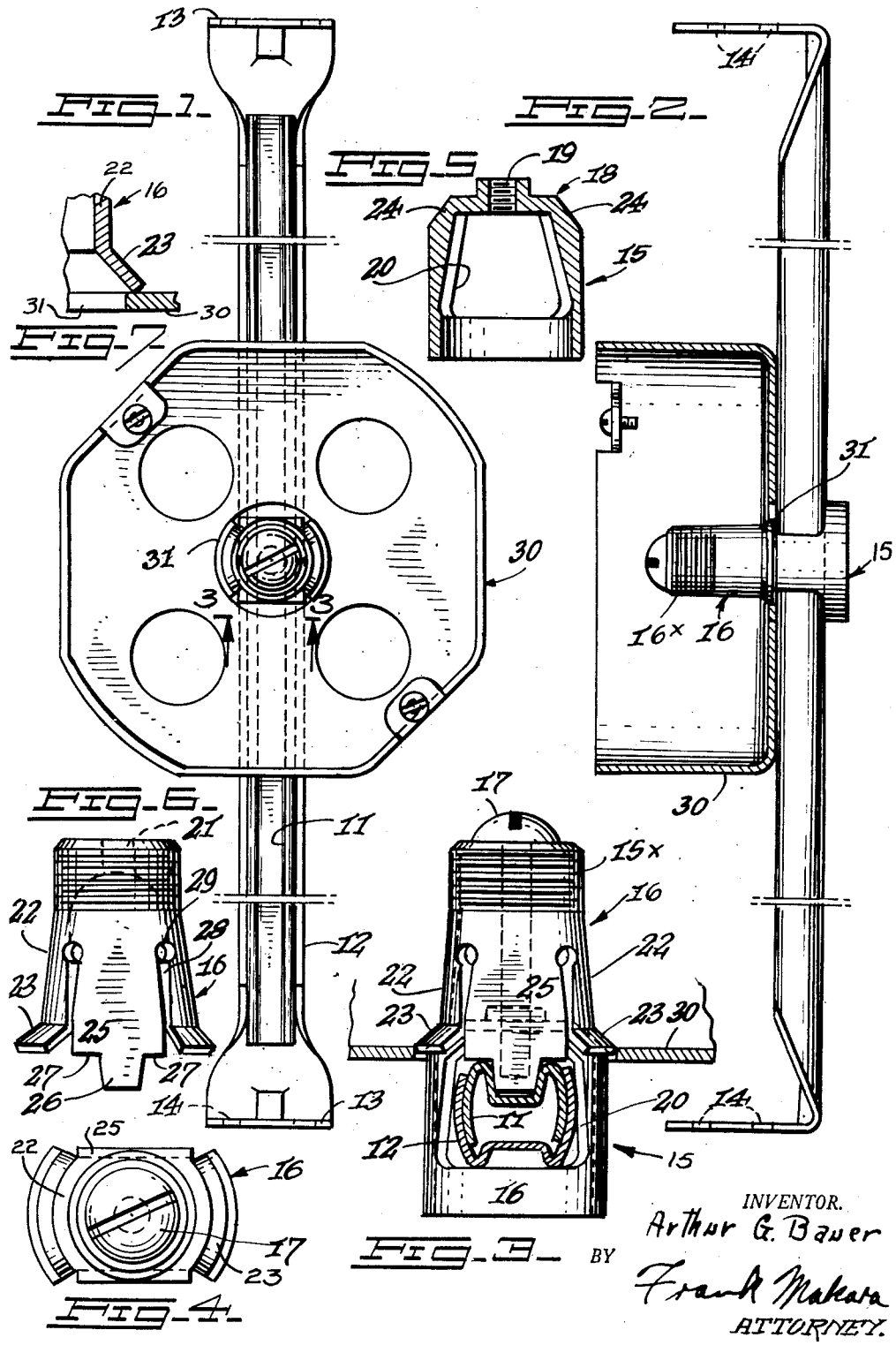

2,824,167
LOCKING DEVICE FOR OUTLET BOX
Arthur G. Bauer, Baldwin, N. Y.
Application October 25, 1955, Serial No. 542,705
2 Claims. (Cl. 174—63)

This invention relates to a locking device for locking an electrical outlet box to the box support.

It is an object of this invention to provide a locking device adapted to easily and rapidly lock rigidly an outlet box to the box support structure.

It is another object to provide a locking device of simple construction and inexpensive manufacture.

These and other objects will become apparent upon reading the following descriptive disclosure taken in conjunction with the accompanying drawing in which:

Fig. 1 is a bottom view looking up into an electrical outlet box disposed between ceiling rafters (not shown), Fig. 2 is a longitudinal view sectional in part to show the manner in which the locking device engages the outlet box in locking relationship, Fig. 3 is a detailed view of the locking device showing the expansible skirt engaging the walls of an outlet box aperture and further showing in section the interlocking arms and taken on line 3—3 of Fig. 1, Fig. 4 is a top view of the stud showing the top of a metal holding screw, Fig. 5 is a longitudinal section view of the clamp element, Fig. 6 is a side view of the stud element, and Fig. 7 is a partial section view showing the flange on top of the outlet box.

Referring to the drawing an inner longitudinal support arm 11 is captively held in an outer support arm 12 by conventionally curvatured surfaces. The inner arm 11 is provided with a U-shaped channel to receive a U-shaped lug of a stud described hereinafter.

The arm 11 slides captively in arm 12 thereby permitting engagement of the expansible arms 11 and 12 to rafters disposed at different distances to one another. Each of the arms 11 and 12 are provided at their exterior ends with integral flat elements 13 adapted to engage the flat wall of a respective rafter. Also the flat elements 13 are provided with apertures 14 to receive nails or screws thereby securing the expanded arm support to the rafters (not shown).

The locking device of this invention consists of a clamp 15 (Fig. 5) and a co-acting stud 16 (Fig. 6) removably secured to one another by a metal screw 17 (Fig. 3).

The clamp 15 is a cylindrical element having a curvatured dome section 18. An aperture 19, screw threaded to receive metal screw 17, is disposed axially in the dome 18 of the clamp 15.

The clamp 15 is provided with a pair of lateral parallelly disposed apertures 20 in the vertical cylindrical wall thereof, adapted to receive nested arm elements 11 and 12 (Fig. 3).

The stud 16 (Fig. 6) is of cylindrical configuration having a flat top with an aperture 21 disposed therein.

A pair of opposed flanged skirts 22 are formed in the stud 16 by slotting the stud upwardly from its base, each flanged skirt 22 being provided with an outwardly disposed flange 23 disposed at an angle to slidingly engage the dome 18 of clamp 15. The dome 18 may be round but it preferably is provided with a flat annular angularly disposed shoulder 24 having the angle of the flange 23, thereby permitting flange 23 to engage shoulder 24 over a large area of contact.

The stud 16 is further provided with a pair of locking skirts 25, each provided with a lug 26 and opposed shoulder 27.

The lug 26 is U-shaped and is adapted to nest into the U-shaped channel of longitudinal element 11 (Fig. 3). The locking skirt 25 may be pressed flat or it may remain curvatured, if so desired.

The stud 16 is provided with exterior screw threads 16X for engaging conventional light fixtures.

Both the pair of flanged skirts 22 and the pair of locking skirts 25 are formed by providing the stud 16 with four slots 28 disposed at right angles to one another. The slots 28 are preferably provided at their interior end with a rounded edge 29.

As shown in Fig. 3, the stud 16 is disposed on top of the clamp 15 with the flanges 23 thereof engaging the shoulder 24 of the said clamp. The screw 17 is then passed through stud aperture 21 and next into clamp aperture 19. The longitudinal support arm 12 is then inserted through both lateral apertures 20 of clamp 15 and the co-acting support arm 11 is next slidably and captively disposed therein.

The assembled unit is then secured between a pair of rafters by means of screws disposed in apertures 14. Next a conventional outlet box 30 having a central aperture 31 is placed loosely over the stud 16 with said stud being disposed through said outlet box aperture 31 (Fig. 2).

The tightening of screw 17 brings the shoulders 27 of skirt 25 in engagement with arm 11 (Fig. 3) thereby locking the locking skirt 25 to said co-acting arms 11 and 12 at a selected position along said nested arms. Simultaneously tightening of screw 17 wedgingly forces the flanges 23 to ride downwardly against shoulders 24 thereby forcing the flanges outwardly to engage the walls of outlet box aperture 31 (Fig. 3), or the flanges may ride upon the outlet box surfaces immediately adjacent the aperture 31 (Fig. 7). In either event the flanged skirts 23 are forced outwardly by the shoulders 24 upon applying the necessary force by screw 17, thereby causing the flanges 23 to forcefully and rigidly engage the outlet box 30 either on the wall of aperture 31 thereof or upon the box surface adjacent said aperture 31, depending upon the angles of both the flange 23 and its co-acting shoulder 24.

The manufacture of the clamp 15 and of the stud 16 is preferably from sheet metal of suitable thickness, said sheet metal being given a cylindrical configuration by conventional methods of stamping, deep drawing and metal turning. In this event clamp 15 may be provided with a slit (not shown) between aperture 20, which in no manner effects the operation of the clamp since the clamp 15 is made of suitably thick and strong sheet stock. The stud 16 can be made from sheet metal by conventional deep drawing and turning means.

This invention has been described by means of illustrative embodiments but its scope is clearly greater than these illustrations thereof.

I claim:

1. A locking device for securing an electrical outlet box to a pair of captively and slideably disposed support arms comprising a clamp having a cylindrical configuration and a curvatured dome and provided with a pair of lateral apertures adapted to receive said support arms therethrough, said dome having a screw threaded aperture therein, a stud having a cylindrical configuration and a flat top having an aperture therein, said stud having a pair of opposed skirts each having a flange disposed outwardly at its base, and adapted to engage and clamp said outlet box to said support arms when slidingly forced upon the dome of the clamp, said stud further having a pair of opposed locking skirts disposed between said flanged skirts and adapted to engage and lock said captively held support arms and screw means disposed through said aperture of said stud and into said screw threaded clamp aperture for securing said stud to said clamp and for slidably forcing said skirt flanges on said dome to effect a simultaneous locking and clamping movement of said locking and flanged skirts, respectively, when said screw is tightened in said screw-threaded aperture of said clamp.

2. In an apparatus for holding electrical fixtures having a pair of longitudinal arms adapted to slidably and captively engage one another and having means for securing to rafters the improvement comprising a clamp having a cylindrical configuration and a dome and provided with a pair of opposed lateral apertures for receiving said support arms, said dome having a screw threaded aperture therein; a stud having a cylindrical configuration and a top having an aperture therein, said stud having four slots extending upwardly from the base of the configuration forming a pair of opposed skirts, each having a flange disposed outwardly at its lower end suitable for engaging and locking said outlet box to said support arms when slidingly forced upon the dome of the clamp, said stud further having a pair of opposed locking skirts disposed respectively between said flanged skirts for engaging and locking said captively held support arms and a screw disposed through said aperture of said stud and into the screw threaded aperture of said clamp for securing said stud to said clamp and to effect simultaneous locking and clamping movement of said locking and flanged skirts, respectively, when said screw is tightened in said screw threaded aperture of said clamp.

References Cited in the file of this patent
UNITED STATES PATENTS

| | | |
|---|---|---|
| 1,719,318 | Buchanan | July 2, 1929 |
| 2,316,389 | Atkinson | Apr. 13, 1943 |
| 2,729,414 | Clark | Jan. 3, 1956 |
| 2,732,162 | McKinley | Jan. 24, 1956 |
| 2,788,188 | Smith et al. | Apr. 9, 1957 |